April 7, 1964 D. G. FAWKES 3,127,967
SELF-LOCKING DIRECT NUT OPERATOR
Filed Sept. 22, 1961 3 Sheets-Sheet 1
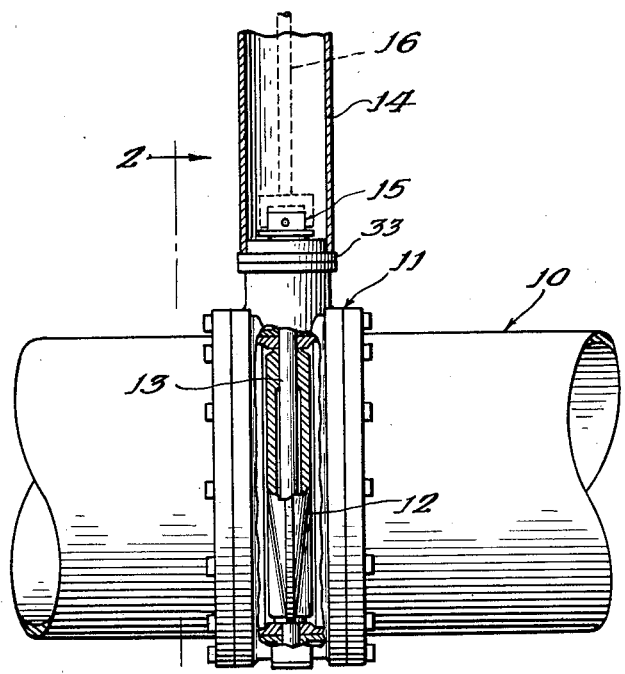
FIG.1
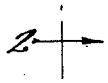
FIG.2
FIG.3
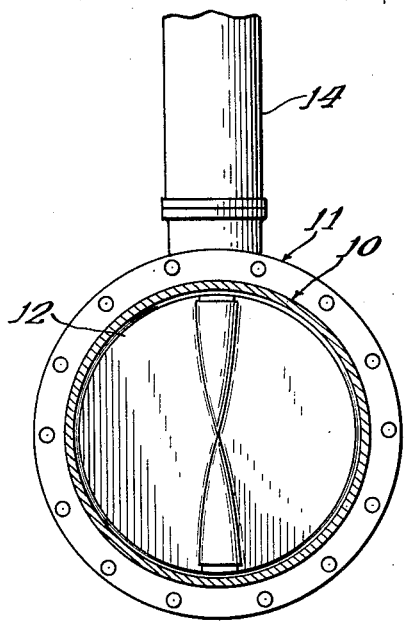
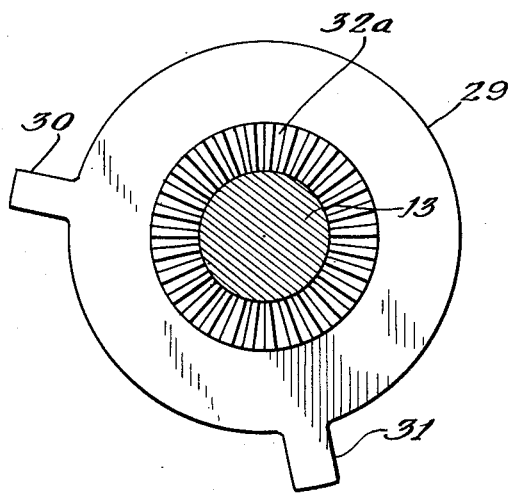
Inventor:
Donald G. Fawkes
By: Hofgren, Brady, Wegner,
Allen & Stellman
Attorneys April 7, 1964     D. G. FAWKES     3,127,967
SELF-LOCKING DIRECT NUT OPERATOR Filed Sept. 22, 1961     3 Sheets-Sheet 2

April 7, 1964    D. G. FAWKES    3,127,967
SELF-LOCKING DIRECT NUT OPERATOR
Filed Sept. 22, 1961    3 Sheets-Sheet 3

United States Patent Office 3,127,967
Patented Apr. 7, 1964

3,127,967
SELF-LOCKING DIRECT NUT OPERATOR
Donald G. Fawkes, Chicago, Ill., assignor to Henry Pratt Company, a corporation of Illinois
Filed Sept. 22, 1961, Ser. No. 139,921
5 Claims. (Cl. 192—8)

This invention relates to an operator for a valve and more particularly to an operator for direct connection to the shaft of a butterfly valve, which will maintain a butterfly valve in a locked position and may be engaged or disengaged from the locked position as a part of the movement involved in opening or closing the valve.

In a butterfly valve the valve closure is a disc-shaped member which is pivotally mounted on an axis perpendicular to the flow passage of the fluid passing through a pipe line. When in a closed position, the valve closure is in peripheral sealing contact with the interior of the valve housing. To control flow of the fluid through the pipe line the valve closure is pivoted about its axis, thus providing an opening in size, relative to the number of degrees through which the valve has been pivoted. When the valve is pivoted 90° from its sealing position, it is in a fully open position and in such a position it is substantially parallel to the direction of flow of the fluid within the pipe line. The valve may have its disc set at any position between fully open and fully closed to throttle fluid flow. Fluid flow about a partially opened valve disc may have a tendency to cause the disc to be further pivoted about its axis or "drift" toward fully open or closed position.

The primary object of this invention is to provide a new and improved operator for a valve which will maintain the valve closure in a fixed position against the tendency of the valve closure to move from a selected position under influence of passage of fluid through the valve.

Another object of this invention is to provide an operator for a valve which is provided with a lost motion connection between a nut and a stem of the valve whereby the turning of the nut moves the stem out of locking engagement as well as turning the valve closure.

Still another object of this invention is to provide a direct nut operator for a valve wherein a nut is connected to a valve shaft with a lost motion connection and a locking member is secured to the shaft for turning with the shaft and the nut is operatively connected to the locking member to move the locking member out of locking relation during a lost motion movement of the nut relative to the valve shaft.

Further objects, features and advantages of the invention will be readily apparent from the following specification taken with reference to the drawings, in which:

FIGURE 1 is a fragmentary elevational view in partial section showing a butterfly valve and operator embodying the invention;

FIGURE 2 is an end elevational view taken along the line 2—2 of FIGURE 1 showing the valve in a closed position;

FIGURE 3 is a bottom plan view of a valve stem sleeve taken substantially along line 3—3 in FIGURE 4;

Figure 4:
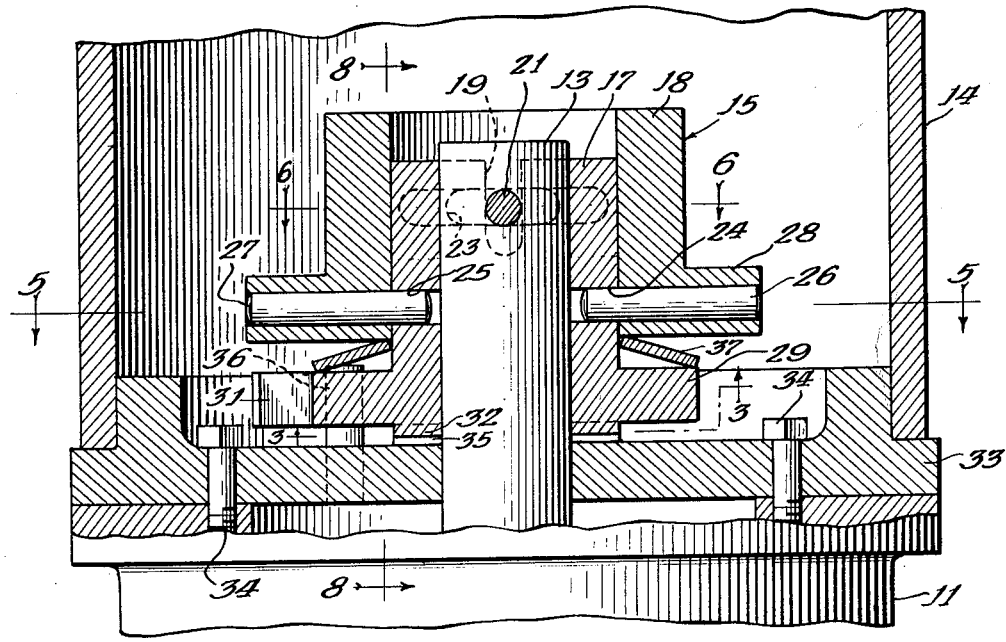
FIGURE 4 is a fragmentary vertical sectional view taken along the center line of a valve housing showing the nut operator on the stem of the butterfly valve of FIGURE 1.
Figure 5:
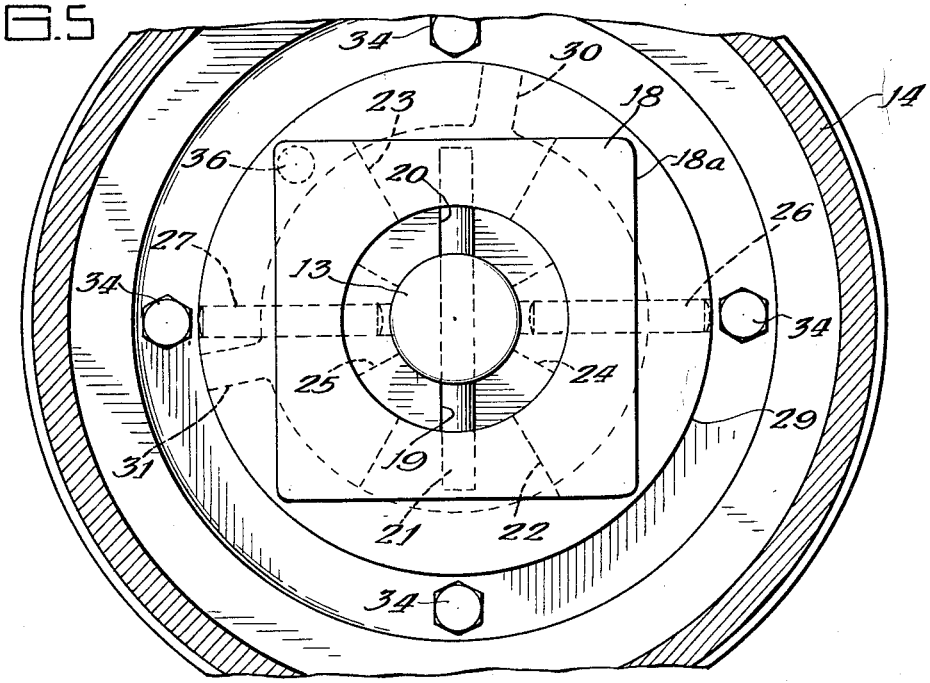
FIGURE 5 is a fragmentary sectional view through the operator of FIGURE 4 taken substantially along the line 5—5 of FIGURE 4.

Referring now to the drawings, in FIGURE 1 there is shown a pipe line 10 in which there is mounted a valve housing 11 including a valve disc 12 rotatably mounted on a valve stem or valve shaft 13. Mounted on the valve housing 11 is a soil pipe 14 in which is located a nut operator 15 adapted to be turned by a wrench such as a "T-wrench" as shown in phantom at 16. The valve is buried in the pipe line below ground and the soil pipe provides access to the operator 15 mounted directly on the shaft of the valve.

Referring now to FIGURE 4, it may be observed that the nut operator 15 is secured to an extension of the valve shaft or valve stem 13. A sleeve 17 is mounted about the valve shaft or stem and a nut 18 surrounds the sleeve for the purpose of imparting rotary motion to the valve stem as desired. Preferably, the nut 18 has the configuration of a standard American Water Works Association square nut, having an outer square shape with flat surfaces as indicated at 18a.

The sleeve 17 includes a pair of diametrically opposite longitudinal slots 19 and 20. A cross pin 21 is secured to the stem 13 and extends outwardly through the slots 19 and 20 to prevent any turning of the sleeve relative to the stem while permitting limited motion of the sleeve longitudinally of the valve stem 13. The nut 18 has a cylindrical interior surface fitting loosely about the sleeve permitting relative limited rotation between them. Some lost motion between the nut and the sleeve is provided to allow movement of the sleeve longitudinally of the valve stem prior to turning the valve stem. The lost motion is accomplished by extending the cross pin 21 outwardly into wide angle slots 22 and 23 formed in the nut and extending across the shaft axis. The nut 18 may turn freely about the sleeve without turning the sleeve, until the cross pin 21 engages one side or the other of the wide angle slots.

Wide angle V-shaped slots or camming slots 24 and 25 are formed in the sleeve 17 and cooperate with camming pins 26 and 27. The pins 26 and 27 are secured firmly in the nut flange 28 and extend inwardly to engage the camming slots 24 and 25. The combination of the slots 24 and 25 and the pins 26 and 27 provide a means for giving the sleeve limited movement longitudinally of the stem. The combination of the slots 19 and 20 and the pin 21 secures the sleeve for turning movement along with the stem.

The sleeve 17 has a flange 29 at its lower end. Projecting radially outward from the flange is a pair of spaced ribs 30 and 31 which are used to limit rotary movement of the sleeve and thus the valve shaft. At the bottom of the sleeve 17 there is provided an outwardly extending boss 32 which includes a serrated surface 32a for cooperation with a mating surface to lock the sleeve in a selected position.

A mounting plate 33 may be secured to the valve housing 11 by means of bolts 34. The mounting plate 33 is provided with an upstanding boss 35 which includes a serrated surface or locking surface 35a and a stop limit pin 36. The serrated surface 35a and the mounting plate 33 are adapted to cooperate with the serrated surface 32 of the sleeve 17 to lock in mating relation. The pin 36 cooperates with the spaced ribs 30 and 31 to prevent the valve disc from being turned more than 90° from its sealing position or on through sealing position. The sleeve 17 is urged into locking position with the serrated surface 35a of the mounting plate 33 with the aid of a circular spring washer or urging means 37.

An alternative method of providing a locking surface for mating with the serrated surface of the sleeve is to form a boss with a serrated surface and stop limit pin on the top of the valve housing. This may be done as a part of the process of casting and machining the housing proper and eliminates the need for a separate mounting plate.

When it is desired to change the position of the valve disc, a standard wrench, such as a standard "T-wrench" is first fitted over the nut 18. The valve disc is in its locked position with the pin 21 at the mid-point of the wide angle slots 22 and 23 in the nut 18. The nut is then turned. Initially, the camming pins 26 and 27 are in the center of the wide angle V-shaped slots 24 and 25. The first movement of the nut about the sleeve turns the camming pins in the V-shaped slots, causing a longitudinal movement of the sleeve 17 relative to the stem 13 and disengaging the sleeve 17 from its locking mating relation with the plate 33. The rotary movement of the nut 18 necessary to form this disengaging function of the sleeve 17 brings the side of the wide angle slots 22 and 23 into contact with the pin 21. Up to this point, none of the turning movement is transmitted to the stem or the sleeve.

By continuing to turn the nut 18 in the same direction the valve shaft is turned through engagement between the pin 21 and the sides of slots 22 and 23. Since the pin 21 is mounted in the stem 13 and passes through longitudinal slots 19 and 20 in sleeve 17, the sleeve is also caused to rotate. Turning the stem 13 opens or closes the valve disc 12. After the lost motion between the nut and pin 21 has been taken up, the turning motion of the nut 18 is directly transmitted to the sleeve 17 and the stem 13 turning the valve disc 12. A valve disc may be turned no more than 90° from its closed valve, sealing position. It is prevented from being turned further because a stop limit pin 36 will come in contact with one of the ribs 28 or 28a preventing the nut 18 from being turned further in the same direction and transmitting turning movement to the valve disc 12.

Figure 6:
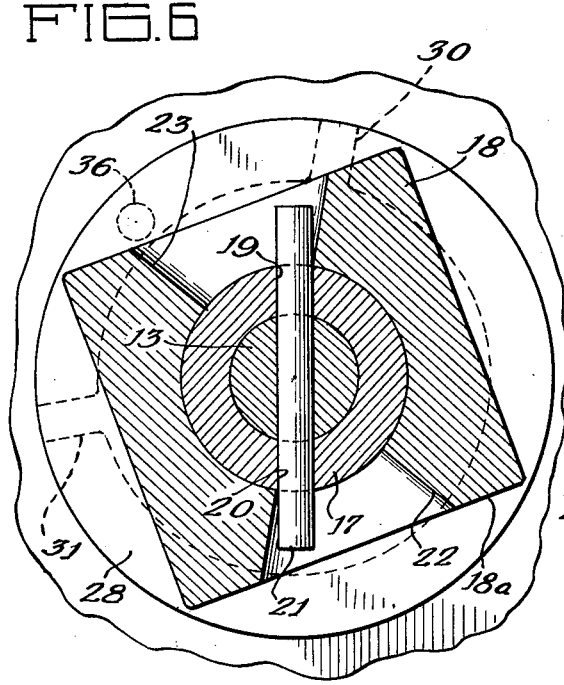
FIGURE 6 is a fragmentary sectional view of the operator taken along the line 6—6 of FIGURE 4 showing the position of the nut when the lost motion has been absorbed as part of the valve turning movement.
Figure 8:
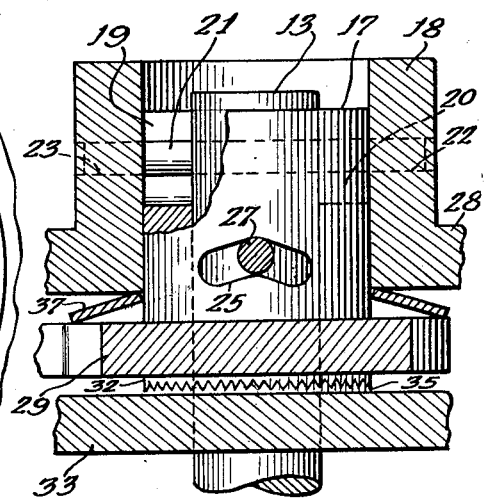
FIGURE 8 is a fragmentary vertical sectional view of the operator in a locked position and taken substantially along line 8—8 in FIGURE 4.
Figure 7:
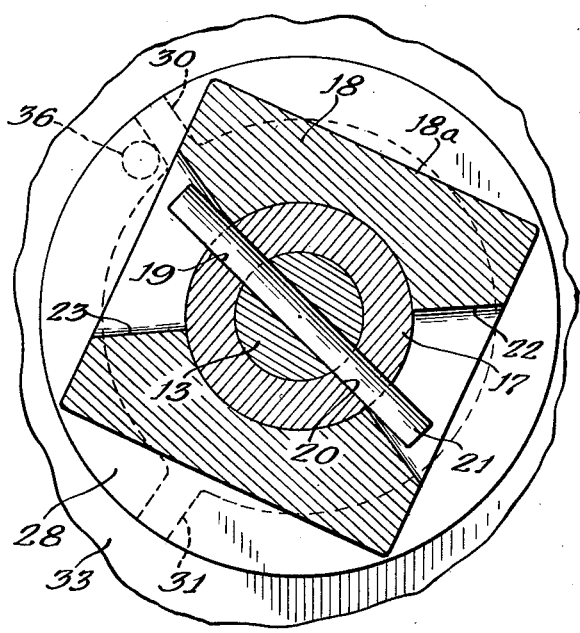
FIGURE 7 is a sectional view similar to FIGURE 6 showing the relation of the components of the operator at the end of the turning movement of the nut.
Figure 9:
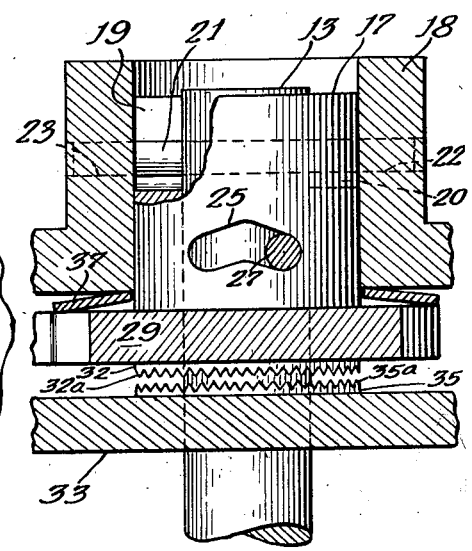
FIGURE 9 is a vertical sectional view similar to FIGURE 8 showing the operator in an unlocked position.

When the turning force is removed from the nut 18, the spring 37 urges the sleeve 17 to move downward, relatively causing the pins 26 and 27 to rise in the cam slots 24 and 25 to a position such as shown in FIGURE 6. This relative longitudinal movement downward of the sleeve, also causes angular movement of the pins 26 and 27 and this motion is transmitted to the nut 18, causing it to turn until the pin 21 bisects the wide angle slots 22 and 23. This relative longitudinal movement of the sleeve 17 also causes the serrated surface 32a of the sleeve 17 to lock in mating relation with the serrated portion 35a of the mounting plate 33, preventing the sleeve 17 from rotating. The stem 13 is locked against rotation because the pin 21 which is mounted on the stem 13 remains in the slots 19 and 20 of the sleeve 17. Thus, the valve disc is locked since the stem 13 upon which it is mounted is prevented from turning.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A self-locking direct nut operator for a valve stem, comprising: a valve stem sleeve concentrically mounted on said valve stem for turning movement with the stem and limited movement longitudinally of the stem into and out of locking position holding the stem against turning, said sleeve having a transverse camming slot therein, a nut around said sleeve and having a relatively wide angle slot therein transverse to said valve stem, a first pin secured to the valve shaft and extending outwardly to the wide angle slot in the nut and a second pin secured in the nut and engaging the camming slot in the sleeve, said first pin and wide angle slot providing a lost motion connection between the nut and the valve stem for camming the sleeve during initial movement of the nut to take up said lost motion.

2. A self-locking direct nut operator for a valve stem, comprising: a valve housing; a valve stem sleeve mounted on said valve stem for turning movement with the valve stem and limited movement longitudinally of the stem, said sleeve having a transverse camming slot and a longitudinal slot therein and locking means formed at one end thereon; a nut mounted on said valve stem sleeve having a wide angle slot therein transverse to said valve stem, and means thereon for camming engagement with said transverse camming slot; a pin extending transversely of the nut and stem, anchored to said valve stem and passing outwardly through said longitudinal slot and relatively into said wide angle slot in said nut, said pin and wide angle slot establishing a lost motion device between the nut and valve stem for camming the sleeve longitudinally of the valve stem; locking means mounted stationary relative to the valve stem and mating with said valve stem sleeve locking means to lock the valve stem shaft against movement relative to the valve housing.

3. A direct nut operator for a valve stem, comprising: a valve stem sleeve concentrically mounted on said valve stem for turning movement with the stem and limited movement longitudinally of the stem, said sleeve having a camming slot therein diagonally arranged relative to the longitudinal direction of movement of the sleeve, a nut concentrically mounted on said sleeve and having a relatively wide angle slot therein transverse to said valve stem, a first pin secured to the valve stem and extending outwardly through the wide angle slot in the nut; a second pin secured in the nut and engaging the camming slot in the sleeve, said first pin and wide angle slot providing a lost motion connection between the nut and the valve stem; and spring means urging the sleeve longitudinally of the valve stem so that initial turning of said nut from a rest position may cam and move said sleeve longitudinally of the valve stem against the spring means while taking up the lost motion between the nut and the valve stem.

4. A direct nut operator for a valve stem establishing a lost motion device, comprising: a circular cylindrical valve stem sleeve having a flange, said sleeve being concentrically mounted on said valve stem for turning movement with the stem and limited movement longitudinally of the stem, said sleeve having a slot extending longitudinally and a transversely extending camming slot therein, said transverse camming slot being formed at an angle to the center line of said stem, said flange of said sleeve being formed with a locking surface at the base thereof; a nut having a flanged base and concentrically mounted on said valve stem sleeve, said nut having a wide angle transverse slot therein; a first pin extending transversely of the nut and stem, anchored to said stem and positioned in said longitudinal slot in said valve stem sleeve and in said wide angle transverse slot in said nut, said pin being movable in said wide angle transverse slot into engagement with sides thereof establishing a lost motion connection between the nut and the valve stem; a camming pin extending transversely and secured in said nut and positioned in said transverse camming slot in the sleeve, said pin and said camming slots providing means for camming the sleeve longitudinally of the valve stem in cooperation with said lost motion device, and spring means mounted between said valve stem sleeve and said nut providing means for urging said sleeve longitudinally of said stem in the opposite direction of travel caused by said camming means so that initial turning of the nut from a rest position may compress said spring means and move said sleeve against the spring means while taking up the lost motion between the nut and the valve stem.

5. A self-locking direct nut operator for a valve stem, comprising: a valve housing; a valve stem; a valve stem sleeve mounted on said valve stem for turning movement with the stem and limited movement longitudinally of the stem; a plurality of locking teeth on said valve housing; a plurality of locking teeth at one end of said valve stem sleeve in mating locking engagement with said valve housing locking teeth, said valve stem sleeve teeth being stationary relative to said sleeve; a nut connected to the valve stem and said sleeve with a lost motion connection permitting said nut to turn relative to said stem and sleeve; camming means between the valve stem sleeve and the nut to move said sleeve longitudinally of said stem to simultaneously move all of the teeth of the sleeve out of locking engagement with all of the teeth of the valve housing.

References Cited in the file of this patent

UNITED STATES PATENTS 652,244    Brown _____ June 26, 1900